Patented Mar. 23, 1926.

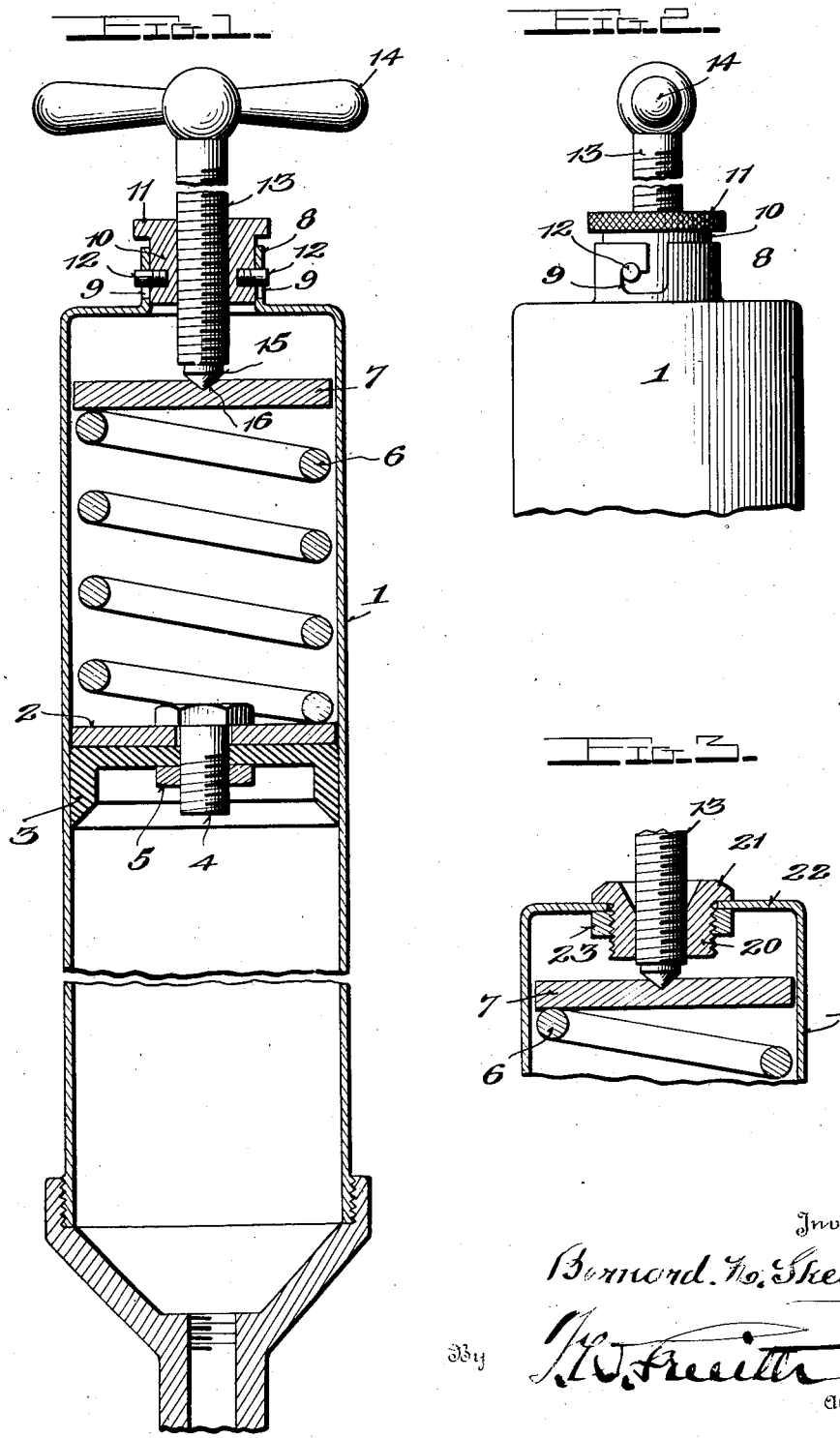

1,577,936

UNITED STATES PATENT OFFICE.

BERNARD H. SKELLY, OF BRIDGEPORT, CONNECTICUT, ASSIGNOR TO BOWEN PRODUCTS CORPORATION, OF AUBURN, NEW YORK, A CORPORATION OF NEW YORK.

AUTOMATIC LUBRICANT-SUPPLY MAGAZINE.

Application filed October 15, 1921. Serial No. 507,967.

*To all whom it may concern:*

Be it known that I, BERNARD H. SKELLY, a citizen of the United States, residing at the city of Bridgeport, in the county of Fairfield and State of Connecticut, have invented certain new and useful Improvements in Automatic Lubricant-Supply Magazines; and I do declare the following to be a full, clear, and exact description of the invention, such as will enable others skilled in the art to which it appertains to make and use the same.

This invention relates to certain new and useful improvements in lubricant supply magazine for oil guns, and the primary object thereof is to provide a structure wherein all of the gun and associated parts, i. e., cylinder, piston, the flexible conduit and valves, are relieved from pressure, except when the gun is in actual use.

A further object of the invention is to provide an oil gun wherein the power necessary to expel the oil is derived from a short spring so as to thereby increase the oil holding capacity of the cylinder.

A still further object of the invention is to provide means for enabling the screw to be easily and quickly removed from the cylinder, without the necessity of laboriously turning the screw throughout its length to remove same.

The invention further aims to provide a simple and economical structure and one which has a minimum of a movable parts subject to derangement.

In the drawings:

Figure 1 is a longitudinal sectional view of the invention, the screw and cylinder being broken away;

Figure 2 is a fragmentary side elevation of Figure 1, and

Figure 3 is a fragmetary view in longitudinal section, of a modified form of the invention.

In proceeding in accordance with the present invention, a cylinder 1, is employed having a piston 2 equipped with suitable packing 3 secured to the piston by a bolt 4 and nut 5. A short but heavy spring 6 seats at one end on the piston 2, while its opposite end has a compression follower disk 7 seated thereupon.

The upper end of the cylinder is formed with a tubular extension or neck 8, having a pair of diametrically opposed bayonet-slots 9 formed therein, the slots each extending through the upper or free outer end of the neck, as depicted in Figure 2. A nut 10 is conformably fitted in the neck interior and has a knurled flange 11 on its outer end to afford convenient means for manipulation in order to operatively connect and disconnect the nut to and from the neck, the nut having pins 12 suitably affixed thereto for reception in the respective bayonet-slots 9. The screw 13 has a handle 14 therein and is received in threaded engagement with the nut 10, the inner end of the screw being cone-pointed as shown at 15 and received in a corresponding bearing 16 in the outer face of the disk 7.

From the foregoing, it will be apparent that by merely turning the nut 10 the latter and the screw can be easily and quickly disengaged from the container without necessitating any unscrewing or turning of the screw. When the spring is compressed, it will hold the pins tight in the bayonet-slots by pressure exerted thereby on the nut. In use, the handle is given as many turns as desired, which compresses the spring and puts pressure on the oil.

Experience will determine to a nicety the number of turns required in order to use the gun for oiling a certain number of bearings on an automobile.

After using the gun, the handle is simply given a turn of two backward which takes all pressure off all parts, preventing leaking of the oil past the valves or seepage of the oil through the packing.

By providing a heavy but short spring the capacity of the cylinder is markedly increased and the screw serves to place the spring under tension, or to store up power therein, to any desired degree, which tension is relieved upon turning of the screw in the reverse direction.

In Figure 3, a modified form of the invention is illustrated, wherein a flanged nut 20 is employed and which has its flange 21 permanently held engaged with the outer face of the end wall 22 of the cylinder by means of a holding nut 23 which is engaged with the inner face of the wall 22. In this form of the invention, the nut 20 is permanently held in its relation to the cylinder, though the screw can be removed without turning thereof through the nut 20, by removing the holding nut 23.

What is claimed is:

1. In an oil gun supply magazine, a cylinder having a piston therein, a spring seated on the piston, a compression follower disk seated on the spring, and an operating screw threadedly connected to the cylinder and having its lower end depending within the cylinder and capable of being driven against said disk or freely withdrawn therefrom, whereby tension on the spring may be effected or relaxed.

2. In an oil gun supply magazine, a cylinder having a piston therein, a spring seated on the piston, a compression follower disk seated on the spring, a detachable nut secured to the head of the cylinder, and an operating screw engaging said nut and having its lower end depending within the cylinder free of said disk and capable of being driven against the latter or withdrawn therefrom to effect or relax the tension on the spring, said screw being thereby removable from the cylinder either independent of or in conjunction with said nut.

3. An oil-gun comprising a cylinder having a piston movable therein, a spring for moving the piston, a compression follower disk seated on the rear end of the spring, an operating screw having its lower end normally positioned within the cylinder and adapted to be in contact with but unconnected to said disk and capable of being driven toward the latter or withdrawn therefrom to effect or relax the tension on the spring, and a nut having a bayonet lock connection with said cylinder, and mounted on said screw whereby the screw is removable from the cylinder either independent of or in conjunction with said nut, and the bayonet lock is normally maintained by the pressure of the spring against the follower disk and the operating screw.

In testimony whereof I affix my signature hereto.

BERNARD H. SKELLY.